United States Patent

Fazekas

[11] Patent Number: 5,540,530
[45] Date of Patent: Jul. 30, 1996

[54] SELF ADJUSTING CONSTRUCTION TIE-DOWN

[75] Inventor: Scott R. Fazekas, Poway, Calif.

[73] Assignee: Simpson Strong-Tie Company, Inc., Pleasanton, Calif.

[21] Appl. No.: 332,713

[22] Filed: Nov. 1, 1994

Related U.S. Application Data

[62] Division of Ser. No. 54,598, Apr. 28, 1993, Pat. No. 5,364,214.

[51] Int. Cl.⁶ .......................... F16B 19/00; F16B 21/00
[52] U.S. Cl. .................. 411/339; 411/510; 411/913; 403/105
[58] Field of Search ..................... 411/338, 339, 411/508, 509, 510, 913; 403/105

[56] References Cited

U.S. PATENT DOCUMENTS

| | | | |
|---|---|---|---|
| 1,347,687 | 7/1920 | Ellis et al. | 411/536 |
| 1,374,713 | 4/1921 | Bell | 403/105 X |
| 1,746,978 | 2/1930 | Winkler | 411/536 |
| 1,953,354 | 4/1934 | Holland-Letz | 411/535 |
| 1,966,780 | 7/1934 | Wyrick | 411/536 |
| 2,405,889 | 8/1946 | Kennedy | 411/535 X |
| 3,115,804 | 12/1963 | Johnson | 411/339 X |
| 4,433,879 | 2/1984 | Morris | 411/535 X |
| 4,604,014 | 8/1986 | Frano | 411/338 |
| 4,708,555 | 11/1987 | Terry | 411/149 |
| 4,761,860 | 8/1988 | Krauss | 411/339 X |
| 5,180,268 | 1/1993 | Richardson | 411/536 |
| 5,254,016 | 10/1993 | Ganthier | 411/339 X |

FOREIGN PATENT DOCUMENTS

| | | | |
|---|---|---|---|
| 796498 | 1/1981 | U.S.S.R. | 411/539 |
| 383460 | 11/1932 | United Kingdom | 411/339 |
| 538702 | 8/1941 | United Kingdom | 411/339 |

*Primary Examiner*—Neill R. Wilson
*Attorney, Agent, or Firm*—James R. Cypher

[57] ABSTRACT

A uni-directional slack adjuster is incorporated into a hold-down tension rod or strap, such as a hold-down anchor bolt for bolting a shear wall on one floor to a shear wall or foundation wall below, when a wood floor joist assembly is in between. The slack adjuster eliminates bolt slack so that in the event of an earthquake or hurricane, the sill plate is positively anchored with no vertical bolt play, eliminating much of the cosmetic damage that is often done to the wallboard and other finished surfaces due to distortion of the wallboard framing as the sill rises abruptly until it reaches the end of travel on the hold-down bolts. The slack adjuster comprises a link in the tensioner and non-reversibly either expands or contracts axially depending on the particular embodiment. The mechanism used can be laterally extended wedges biased into other wedges, one-way clutch-type construction or ratchet engagement, all of which act to decrease the effective length of the tensioning device to take up the slack space which results from wood shrinkage occurring after the tensioning devices have already been installed.

2 Claims, 4 Drawing Sheets

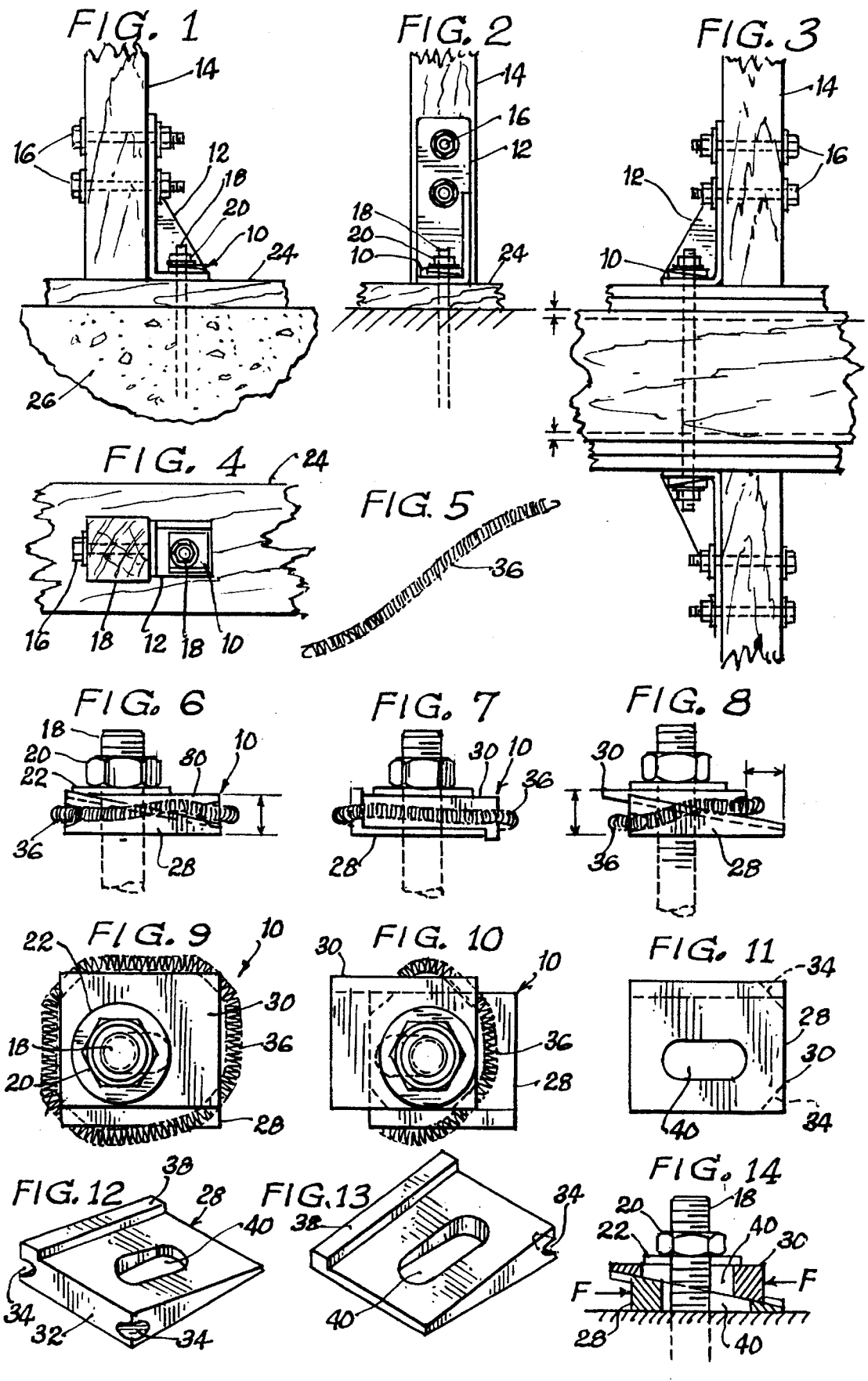

SELF ADJUSTING CONSTRUCTION TIE-DOWN

This application is a divisional application of pending application Ser. No. 08/054,598 filed Apr. 28, 1993 and scheduled to grant Nov. 15, 1994 now U.S. Pat. No. 5,364,214 entitled: Self-Adjusting Construction Tie-Down.

BACKGROUND OF THE INVENTION

The invention is in the field of construction, and more particularly relates to securely fastening together wide expanses of wood cross-grain, in which configuration shrinkage of the wood over time creates slack along the bolt which spans the shrinking members.

The invention particularly relates to protection of structures in high winds or an earthquake. Over the last few decades, considerable professional attention has been devoted studying various aspects of earthquakes such as how quakes can be predicted, how to design high-rise office buildings on float plates so that they will not feel the full force of the horizontal jolts that earthquakes produce, and how to modify buildings and other structures to minimize the danger to those inside and nearby. Much effort has gone into the development of construction techniques which minimize injuries caused by falling glass and collapsing building structures.

This effort has been devoted largely to mitigating the human cost, in terms of lives and serious injury, caused by a Big One. Although these considerations are of primary concern, for every major earthquake which seriously threatens life and property there are many quakes which shake buildings and cause considerable cosmetic damage even though none of the buildings are significantly impaired from a structural standpoint.

The instant invention addresses this type of damage which is largely cosmetic, and focuses on a particular detail of current construction which results in instability in the framing of wallboard, plaster, brick veneer or other surface panels, which in turn causes the overstressing of these panels at frame attachment points in extreme conditions of wind or earthquake. These panels are strong and can withstand considerable shock without damage if on secure framing.

However, when frame above an underlying horizontal wood support member such as a joist which has a thickness exceeding several inches, trauma damage is particularly likely. This is due to the fact that hold-down bolts which pass vertically through the structural members beneath the panels may span a wood "sandwich" of 10 to 15 inches normal to the grain, and considerable axial play generally develops between the bolt head and the retaining nut over time, as the wood dries out and shrinks. These bolts, commonly used for both second stories and for the first story if the house is built on a foundation wall, hold down the bottom of the frame, and it is the frame which prevents the laterally-bracing shear walls from overturning.

These long bolt spans may create slack up to ⅜ths inch or even ½ an inch in an extreme case. In a quake, panels overlying these areas are readily damaged as the frame distorts in shape as it raises off of the sill plate at one or both ends. The framing "rattles" around, causing stress at the drywall joining points, resulting in fracture lines and segments torn loose from the wall.

Beyond cosmetic damage, earthquake motion causes a dynamic "hammering" effect on the building, which multiplies the forces on the building structure to levels not considered in structural engineering calculations when the structure was designed. Premature structural failure may occur. If a three-foot by eight foot shear wall is allowed to have one corner uplift by ⅜ inch due to slack in the hold-down member, the lateral displacement (or "drift" as it is called in the building code) of the top will be about one inch, which is double the allowable drift set forth in the Code. Current construction practices do not address this wood shrinkage problem because there is no readily available solution.

In an instance in which long vertical bolts are used, if the connection of the bottom of the wallboard framing to the underlying structure were modified to eliminate the possibility of subsequently developed slack along the bolt, much of this damage could be avoided. The problem caused by wood shrinkage as it relates to maintaining a tight connection is addressed in U.S. Pat. No. 4,812,096, disclosing a SELF-TIGHTENING NUT. This invention involves log cabin wall logs wherein each log is fastened to the log underneath with long nails which pass entirely through the upper log and sink into the lower one. The invention is a long nail with a coil spring under the head so the nail is continuously tensioned and compensates for shrinkage.

Different considerations than those in the log cabin log fastener present themselves regarding frame bolt adjustment for quake resistance, as set forth in U.S. Pat. No. 4,812,096, issued Mar. 14, 1989 on a SELF-TIGHTENING NUT. The device of this invention addresses the problem head-on. It incorporates a long coiled spring capable of considerable rotational traveling while exerting considerable torque mounted in a housing over the nut. The spring is wound up much like a window shade coil spring, and as slack occurs along the bolt, the nut is automatically tightened by the coil spring.

This approach is very direct. The coil spring mechanism performs the function of a workman on-site, who would tighten the bolt down periodically as it becomes loose. However, even though it is a direct assault on the problem and stands as testimony to the existence of the problem, it is heavy-handed in its approach, using a long, bulky housing cylinder which is longer than the length of the bolt itself due to the number of winds in the coil spring that are necessary. Even more serious is a possibility of failure. The unit would be out of sight, ordinarily inside a wall, and even if it were in the open, it is questionable whether its non-operative condition would be noticed. A nut that has been on a bolt for ten, twenty, or thirty years is not going to be easy to turn. It is very doubtful that such a nut could be rotated by a coil spring.

There is need for a self-tightening bolt construction that is simple, compact and substantially fool proof, so that it can be out of sight, hidden within walls for years, and still function properly substantially without fail. Because of the nature of the problem addressed, for every 1000 that are installed only a very few would ever be tested by an earthquake, and that may not happen for years after installation, making marketplace feedback a poor tool for improving reliability. Instead, the design must be inherently foolproof from the outset.

SUMMARY OF THE INVENTION

The instant invention fulfills the above stated need by providing a slack adjuster, in several forms, which is incorporated in construction tie-downs to automatically adjust tie-down length to take up any slack caused by wood shrinkage. In its primary embodiment, the invention utilizes a ramp or wedge which occupies an increasingly wider axial space along the bolt as it is pushed into progressive wedged engagement by a spring. In a modification, an axially extended wedge space is occupied by a progressively advancing wedge structure to expand the unit.

In an alternative embodiment, a unidirectional strap is disclosed which can span from wall to wall, or wall to foundation with a floor assembly in between. The strap will only contract, taking up slack so that when the earthquake hits there is a tight, positive hold-down between the frame and the foundation.

BRIEF DESCRIPTION OF THE DRAWINGS

FIGS. 1 through FIG. 14 illustrate a first embodiment of the invention in which FIG. 1 through 4 are sections taken through actual installations;

FIG. 5 is a perspective view of a spring used to retain the two wedge members in place as shown in FIGS. 6 through 8;

FIG. 6 is a side elevation view of the expander sleeve in place on a bolt and retained by a nut and washer;

FIG. 7 is an end elevation view of the expander of FIG. 6;

FIG. 8 is the unit of FIG. 6 but after it has expanded;

FIG. 9 is a top plan view of FIG. 6;

FIG. 10 is a top plan view of FIG. 8;

FIG. 11 is a plan view of one of the wedge elements seen from the outer, flap side;

FIGS. 2 and 13 are perspective views of wedge elements from different angles;

FIG. 14 is a section taken vertically through the expander in partially expanded position;

FIGS. 15 through 17 illustrate a different embodiment of the invention utilizing a conical axially extended wedge shown in side elevation, vertical section, and horizontal section, respectively;

DETAILED DESCRIPTION OF THE PREFERRED EMBODIMENTS

Figure 15:
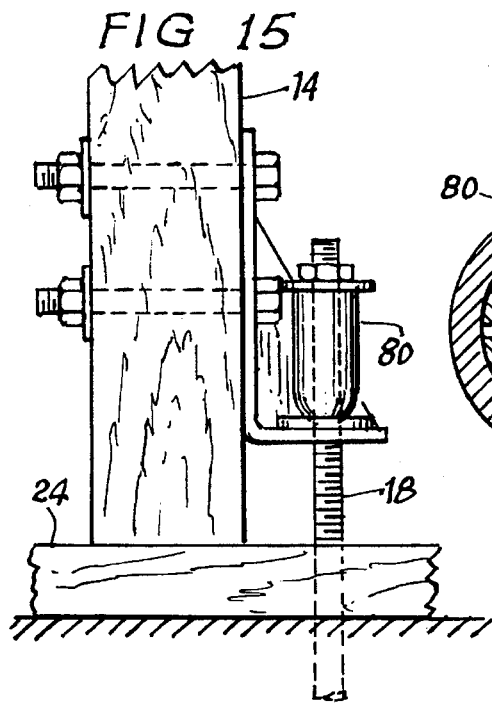

The first embodiment is illustrated in FIGS. 1 through 14, and with slight modifications in FIGS. 34 through 37. In this embodiment the expander unit is used directly on the bolt in the form of a sleeve 10, so-called because it fits over the bolt. In the in-use illustrations of FIGS. 1 through 3, a standard construction detail for a wood framed building is shown, using a standard hold-down bracket 12 mounted to a post 14 with bolts 16, with the bracket being engaged by the hold-down bolt end nut 20 with a washer 20 between the nut and the sleeve. The bolt extends down through the sill plate 22 into the foundation 24 in FIGS. 1 and 2, with FIG. 3 illustrating a modified construction for a second story, this being a more typical configuration in which a wide wood sandwich is subjected to shrinkage.

Figure 12:
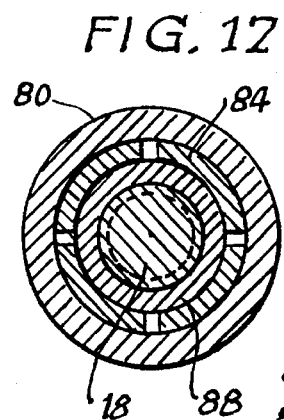

The sleeve itself can most quickly be understood by reference to FIGS. 12 and 13, illustrating the two identical or substantially identical elements that form the principal operating part of the invention. One of these elements must be a wedge or ramp element such as the ramp 28, and the ramp requires another element such as 30 to butt against as it slides into increasingly wedged relation. In this embodiment, the block element 30 is also a wedge. The wedges each have a thick end 32 in which are defined notches 34 for the retaining spring 36 shown in the form of a continuous loop coil spring. To hold the ramps in formation, guide rails 38 are defined on one side of each wedge element to engage the other, this engagement being shown in FIGS. 7, 9, and 10. The elongated slots 40 permit travel in the ramping direction, which is up the ramp, while the ramp elements are engaged on the bolt 18.

This embodiment is advantageous in that it is virtually foolproof, it is compact, simple and inexpensive to manufacture, and it is instantly understandable from a visual inspection, which is a great aide in marketing.

Figure 35:
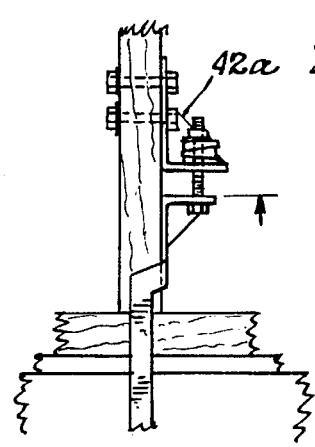
Figure 36:
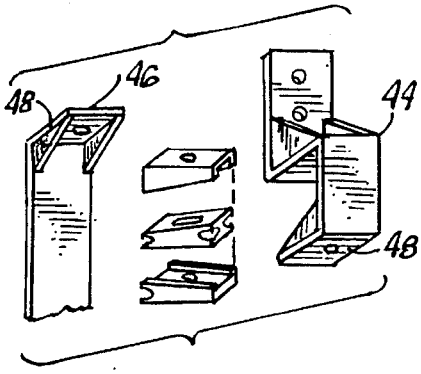

This basic wedge model is shown in an alternative mounting configuration in FIGS. 34 through 37. In these Figures, rather than being engaged directly on the construction bolt 18, a special bracket 42 is used. The bracket has a top member 44 and a lower member 46, which define opposed parallel platform plates 48 which capture the sleeve therebetween, secured by nut and bolt connection 49. This device can be added subsequent to construction to the building. A modification 42a is shown in FIG. 35. This bracket can be made in this simplified form by using the expedient of mounting the expansion sleeve above the upper bracket member 42a, in as much as the sleeves must always be oriented such that shrinkage of the structural members in question results in the expansion of the sleeves.

Figure 29:
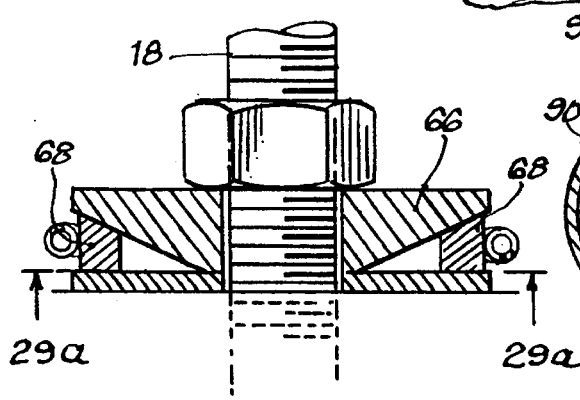
FIGS. 29 and 29a illustrate in section and top view, respectively, a modification of the invention utilizing four radically progressive wedges.
Figure 29A:
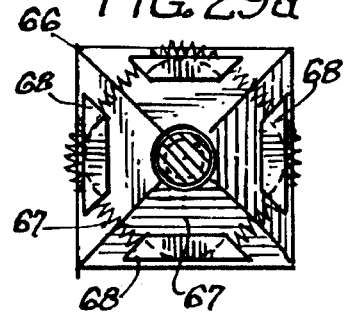
Figure 30:
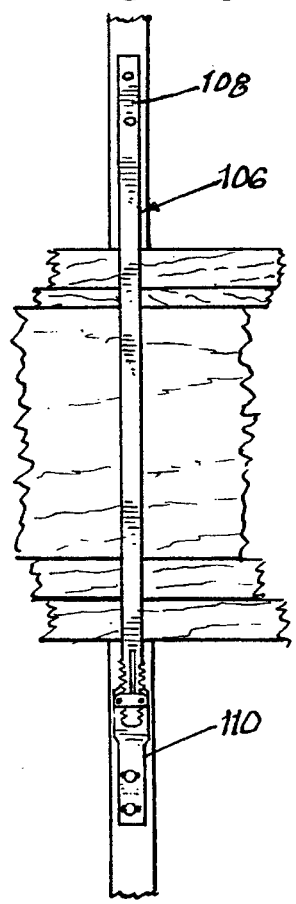
FIGS. 30 through 33 illustrate another embodiment of the invention representing a departure from the wedge structure utilizing a unidirectional, contracting strap, with and without a 90 degree twist, shown in installed mode in front elevation, side elevation, section along lines 32—32 of FIGS. 31, and front devil plan view, respectively.
Figure 31:
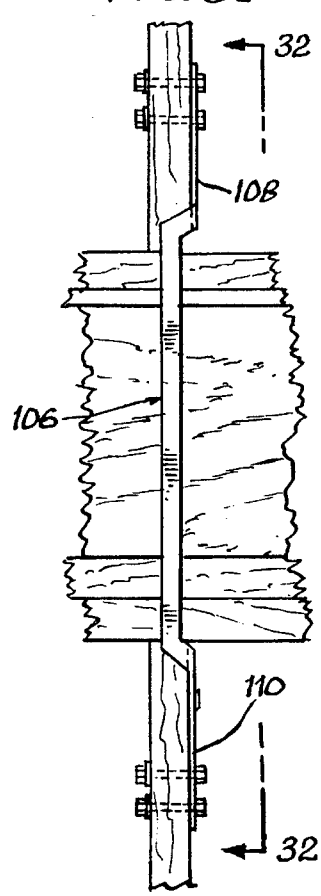
Figure 32:
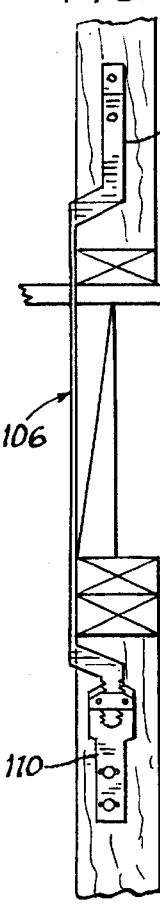

FIGS. 29 and 29a illustrate yet another modification of the basic sliding ramp in which the ramp element comprises a washer 66 having ramped facets 67 on the underside which cooperate with the block elements, or wedges, 68 to expand the sleeve. As can be seen in the plan form view of FIG. 29a, the trapezoidally shaped wedges are engaged by this continuous spring 36 used in the previously described embodiment of FIGS. 1 through 14 urging radial translation of the wedge elements in toward the bolt.

Figure 25:
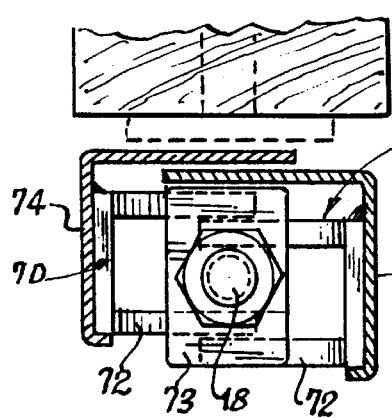

All of the above-described implementations of the invention deal with expanding elements in which lateral movement is translated into axial expansion of the sleeve. The last modification based on this principle is shown in FIGS. 22 through 25. In this instance, a pair of ramp elements 70 are each defined in the form of parallel tines 72, which are mounted at the bottoms of coaxially pivoted swing arms 74, which are pivotally attached at 76 to an upright post through a cinch anchor. A spring 78 compresses the two ramp elements together so that they interleave around the bolt as shown in FIG. 25, and in doing so occupy an increasing axial space.

This configuration conforms to established manufacturing techniques for producing the various straps, brackets and suspenders used in wood joist, beam and stud construction. It is visually cued to that which is already accepted in the construction trade, but probably has no other advantage in relation to the other embodiments shown.

In a slight departure from the lateral translation ramp implementations of the invention described above, FIGS. 15 through 17a represent the first embodiment using a principle not involving lateral translation of a wedge member. Accordingly, the ramp element 80 is in substantially cylindrical form, with a bull nose at the bottom and defining a substantially conical inside ramp surface 82. This ramp surface defines an annular conical wedge shaped block space in which is captured the block element 84, which is not actually a single block but rather several annular conical segments as can be visualized in FIG. 17. The blocks are forced downwardly into the block space 86 by the coil spring, which reacts off the washer 20 of the bolt and nut connector. An inner cone 88 is shown in the Figures, and its use results in a smoother operation of the bolt, as otherwise the block elements would wedge against the threads of the bolt, possibly damaging the threads or themselves. This annular conical element has a slope of about 3 degrees, compared to the slope of the interior ramp surface 82 of about 10 degrees so that the block cavity still converges from top to bottom.

Figure 16:
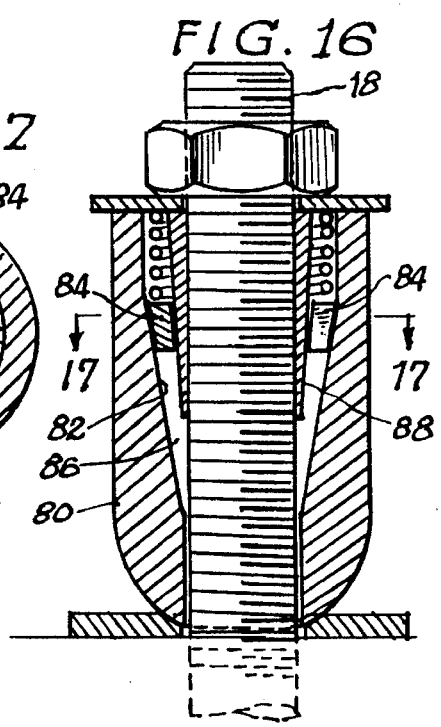

It can be imagined from inspecting FIG. 16 that as the bolt extends upwardly relative to the remaining structure, the washer raises with the bolt, but the spring forces the block elements deeper into the block space, with the result that force is transferred from the nut to the underlying structural member during building trauma and no contraction would be permitted between the nut and the underlying structural member.

Figure 26:
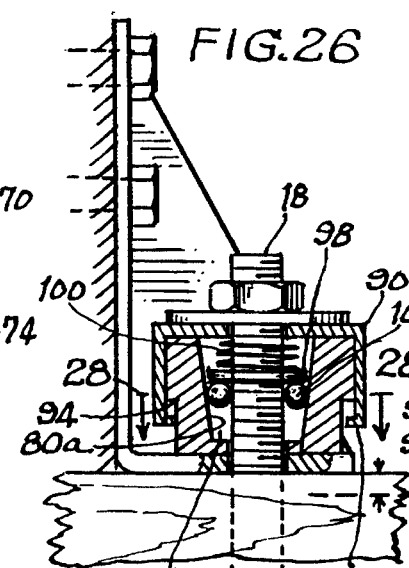
FIGS. 26 through 28 represent yet another modification utilizing axially displaceable ball bearings, in a vertical section, partial vertical section, and horizontal section along line 27—27 of FIG. 26, respectively.
Figure 27:
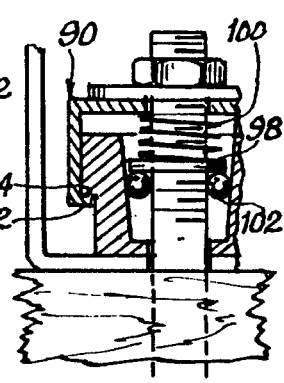
Figure 28:
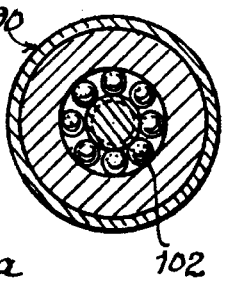

A modification of the axial displacement unit of FIGS. 15 through 17 is shown in FIGS. 26 through 28. Block elements of FIGS. 26 through 28, rather than being conical annular segments, are ball bearings. The lower ramp element 80a is covered by the cage 90 which has an annular inwardly directed lower flange 92 engaged around the shoulder 94 of the ramp element. The inner cone surface 96 converges downwardly, with the bearings being held in the narrowest space that they can occupy by the small washer 98 pressed downwardly by spring 100.

The principle is the same as in the embodiment of FIGS. 15 through 17, but it can be readily appreciated that the use of the bearings 102 create a structure in which no play whatsoever exists when the bolt attempts to move back down. Conversely, expansion of the bolt is easy and free.

Figure 17A:
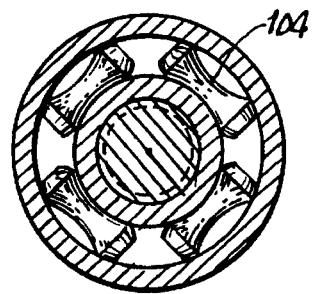
FIG. 17a is a modification of the ball bearing unit of FIGS. 26 through 28 wherein contoured roller bearings are used in place of ball bearings.
Figure 22:
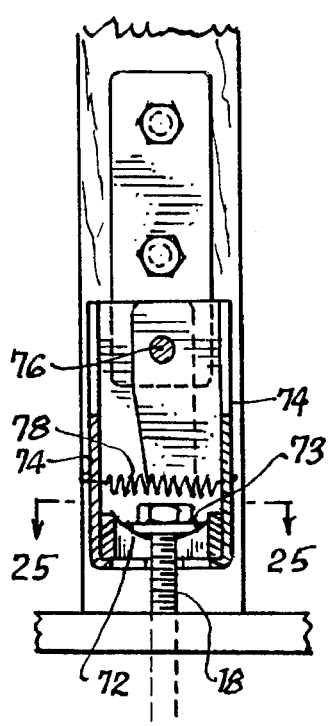
FIGS. 22 through 25 illustrate yet another embodiment in which a pair of double-tined ramps mounted on the ends of coaxially pivoted swing arms swing progressively further into place beneath the contoured washer of the bolt; shown in installed mode in a front elevation partial section, side elevation partial section, front elevation partial section fully expanded mode, and horizontal section of a construction detail, respectively.
Figure 23:
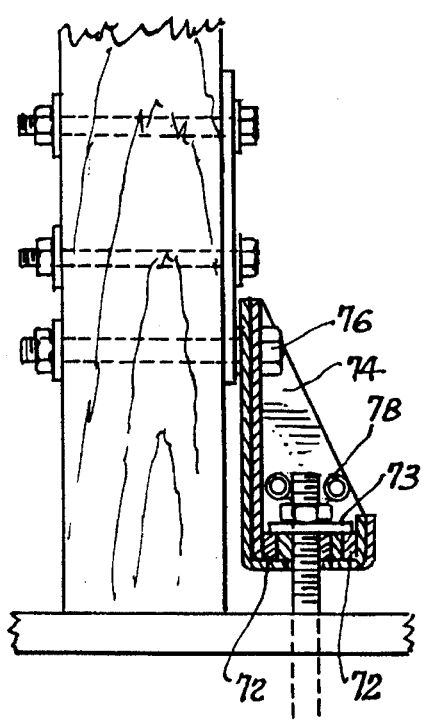
Figure 24:
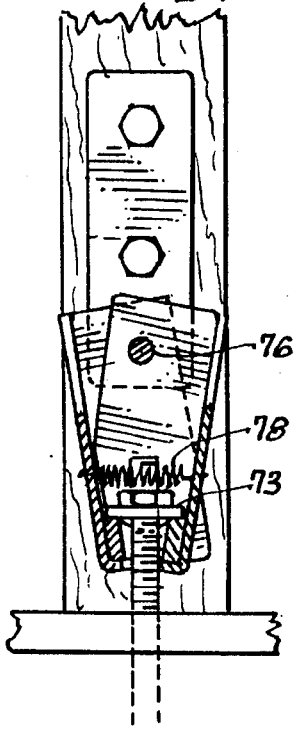

In the event that a heavy duty unit is needed, the bearings may need to be replaced with contoured roller bearings of the type shown in FIG. 17a at 104.

Figure 37:
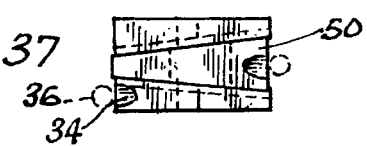
Figure 33A:
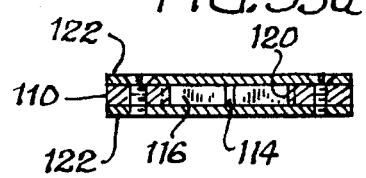
FIG. 33a is a section taken along line 33a—33a of FIG. 33.

A slight modification of the basic wedge unit is shown in FIG. 37. As indicated above, only one ramp element is actually required. However, it is convenient to have two, as they can both be compressed with a single spring and the actual displacement is doubled per unit of lateral travel. Additional wedges accordingly add greater vertical travel, and a third wedge 50 illustrated in FIG. 7 makes this point. Any number of wedges could be used, although obviously it might be impractical to have a tall stack of wedges on a bolt in a construction site.

Figure 18:
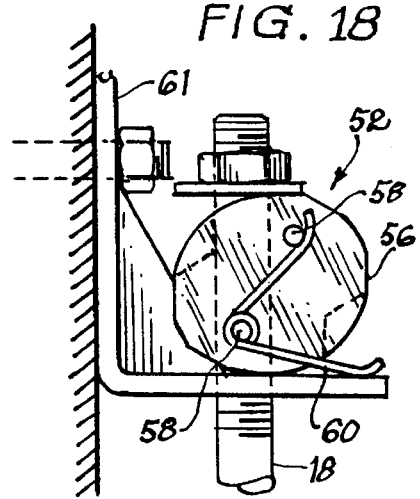
FIGS. 18 through 20 illustrate yet another embodiment of the invention using a rotary cam shown installed in side elevation view in initial position, expanded position, and expanded position rear elevation view, respectively.
Figure 19:
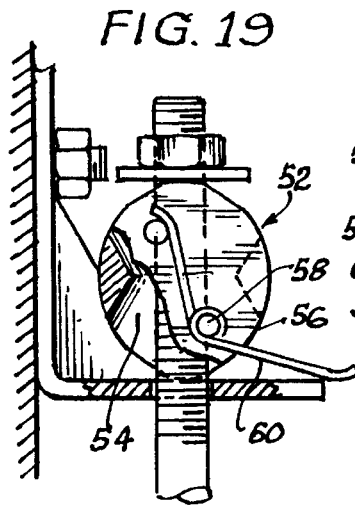
Figure 20:
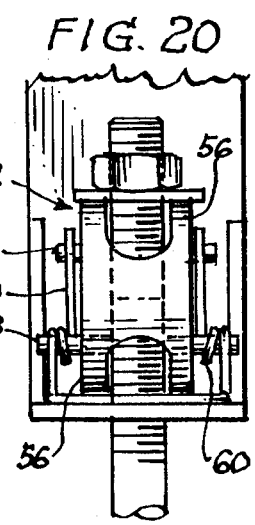

FIGS. 18 through 20 illustrate a modification of the wedge type construction in which lateral movement is used to augment axial displacement, but rather than a wedge in the strictest sense, a roller cam 50 provided with an hour glass shaped bore 54, ordinarily being molded into the cam, is engaged over and is captured by the bolt as shown in the figures. It can be seen that as the cam is rotated counter clockwise from the position shown in FIG. 18 to that of FIG. 19, the rims 56 of the cam, which could be faceted as shown in the figures for a more positive engagement, occupy increasing space between the washer and the bottom of the mounting bracket. To urge the cam into counter clockwise rotation, the cam has spring pegs 58 which engage the bent wire spring 60 which reacts off the horizontal platform of the mounting bracket 61. This design may be more expensive but may not have the sales appeal as the simpler and more easily visualized unit of FIGS. 1 through 14, as discussed above.

Figure 21:
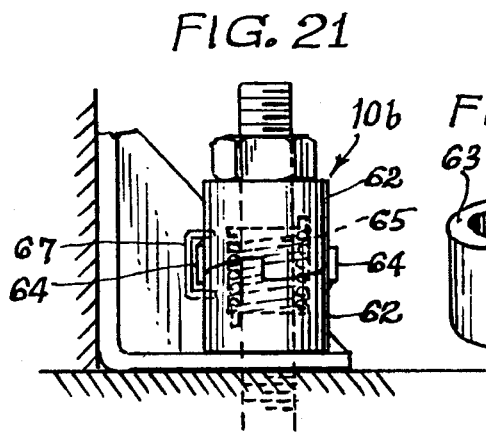
FIGS. 21 and 21a illustrate yet another embodiment having a rotary ramping action using cylinders having helical mating surfaces.
Figure 21A:
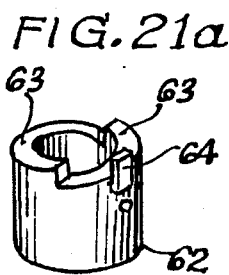

FIGS. 21 and 21a, although appearing visually distinct from the plane linear ramps of the first discussed embodiment, is actually very similar in principle. Rather than linear ramps, the sleeve 10b has two half cylinders 62 which define half-ramp surfaces 63 which interengage as shown in FIG. 21. A guide post 64 projecting from each half cylinder prevents them from rotating more than half circle, as if they did, the halves would collapse together again. A bail 67 engages in holes the respective sleeves to hold the unit in cocked position until it is installed. The internal spring 65 engages the inner walls of the respective halves in any convenient fashion, such as having outwardly bent tips engaged in bores on the inside of the respective half cylinders. Rotation of the halves relative to one another causes the expansion of the axial size of the sleeve as in the linear ramp, and this configuration has the further advantage that the radial extent and plan form of the sleeve does not change as it expands axially.

Figure 33:
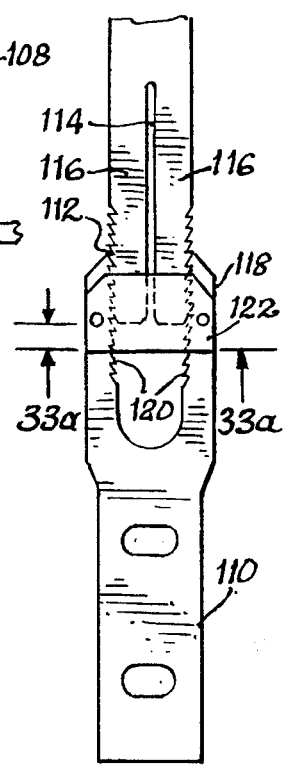
Figure 34:
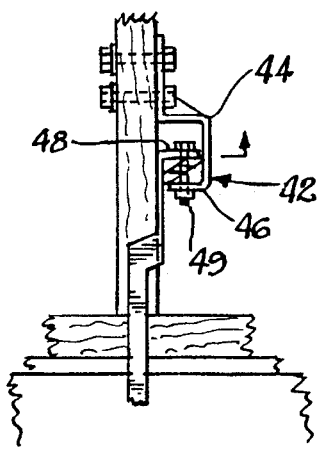
FIGS. 34 through 36 illustrate the embodiment of FIGS. 1 through 14 captured in a special bracket as opposed to being mounted directly on the bolt, shown in side elevation in a first configuration, side elevation in a second configuration, and first configuration exploded, respectively; and, FIG. 37 is a diagrammatic illustration of a modification of the embodiment of G FIGS. 1 through 14 utilizing three wedges rather than two.

The last embodiment represents a departure from the ramping type construction entirely whether laterally or axially displaced, as described above. As shown in FIGS. 30 through 33a, a strap 106 is nailed or otherwise coupled to structural members which span those structural members subject to shrinkage. Its bulk is minimal. The strap 106 has a first elongated member 108 which cooperates with a second elongated member 110. The top member has two arrays of outwardly directed ratchet teeth 112 and a central slot 114 bifurcating the member. The toothed tines compress inwardly against the resilience of the strap metal resulting in the ratchet teeth yielding when the strap is compressed. This portion of the upper strap fits into the bifurcation 118 of the lower strap. the lower strap has inwardly directed ratchet teeth arrays 120 which engage the teeth 112 of the top member as shown in FIGS. 33. The two elongated strap components are planar and of the same width dimension, and are held in place by retainer plates 122 bolted together on opposite sides of the strap.

It can be easily seen that as the two strap halves are pushed together, they ratchet into increasingly compressed relation, but will not pull outwardly. This is the reverse of the expansion member, which expands unidirectionally, rather than contracting unidirectionally, which is of no significance except that when mounting, this must be taken into account.

No doubt in a particular application, one unit from all of the variations described above would be advantageous over the others. Some may prove superior to others in virtually any application, but any of them would work properly to ensure that no slack exists between the nut and the wood frame of the building. In an earthquake, the framing of the wallboard will stay in position, as these expanders can be designed to withstand any desired compression, ordinarily up to about 10,000 pounds. With a firm frame, the wallboard will remain intact through all but very severe earthquakes.

I claim:

1. A unidirectional self length adjustable connector for connecting two structural members comprising;

a. a first elongated member defining a first longitudinally extended array of ratchet teeth;

b. a second elongated member defining a second longitudinal array of ratchet teeth mateable with said first array of ratchet teeth to prevent longitudinal motion in one direction longitudinally of said elongated members when said teeth are engaged;

c. guide means restricting the motion of said elongated members to substantially, mutually longitudinal motion and guiding said elongated members such that said first and second arrays of teeth are engageable;

d. bias means compressing said arrays together such that same engage when attempting to move in said one longitudinal direction, and move out of engagement when moving in the opposite direction; and e. each of said elongated members comprises a strap, one of said straps defining a first elongated member and being bifurcated into two spaced parallel lines to define two opposed outwardly directed parallel arrays of teeth and said second elongated member has two opposed inwardly directed parallel rows of teeth engagable with said outwardly directed rows of teeth.

2. Structure according to claim 1 wherein said tines are resilient and define said bias means.

* * * * *